US007649286B2

(12) United States Patent
Manning

(10) Patent No.: US 7,649,286 B2
(45) Date of Patent: Jan. 19, 2010

(54) ELECTRIC MOTOR STARTING DEVICE

(75) Inventor: John B. Manning, Lakeland, FL (US)

(73) Assignee: LDG Enterprises, LLC, Mulberry, FL (US)

( * ) Notice: Subject to any disclaimer, the term of this patent is extended or adjusted under 35 U.S.C. 154(b) by 425 days.

(21) Appl. No.: 11/370,291

(22) Filed: Mar. 8, 2006

(65) Prior Publication Data
US 2006/0244263 A1 Nov. 2, 2006

Related U.S. Application Data

(60) Provisional application No. 60/659,489, filed on Mar. 8, 2005.

(51) Int. Cl.
H02K 7/10 (2006.01)
(52) U.S. Cl. .......................... 310/41; 310/83
(58) Field of Classification Search ................ 310/41, 310/83, 112
See application file for complete search history.

(56) References Cited

U.S. PATENT DOCUMENTS

| 3,300,697 A | 1/1967 | Woodford | 318/136 |
|---|---|---|---|
| 4,219,764 A * | 8/1980 | Terada et al. | 318/48 |
| 4,707,644 A | 11/1987 | Miller et al. | 318/136 |
| 4,754,606 A | 7/1988 | Nam | |
| 4,901,689 A * | 2/1990 | Cummins et al. | 123/179.3 |
| 5,402,631 A | 4/1995 | Wulf | |
| 5,477,115 A | 12/1995 | McClean et al. | 318/461 |
| 5,485,719 A | 1/1996 | Wulf | |
| 6,125,713 A | 10/2000 | Langlois et al. | |
| 6,834,737 B2 | 12/2004 | Bloxham | 180/165 |
| 7,331,271 B2 | 2/2008 | Sanderson et al. | |
| 2002/0047416 A1 * | 4/2002 | Oliveira et al. | 310/112 |
| 2002/0157881 A1 | 10/2002 | Bakhkoldin et al. | |
| 2003/0052485 A1 | 3/2003 | Poteet et al. | 290/4 R |
| 2003/0060907 A1 | 3/2003 | Poteet et al. | 700/75 |
| 2003/0205213 A1 | 11/2003 | Aquino et al. | |
| 2004/0011523 A1 | 1/2004 | Sarada | |
| 2004/0018805 A1 | 1/2004 | Pham | |
| 2004/0098142 A1 | 5/2004 | Warren et al. | 700/22 |
| 2005/0196298 A1 | 9/2005 | Manning | 417/364 |
| 2005/0224025 A1 | 10/2005 | Sanderson | |
| 2006/0108463 A1 | 5/2006 | Gross et al. | |

OTHER PUBLICATIONS

Elliott, J., "Dual Drive Compressor Uses Both Gas and Electric Power," *Comressor Tech*$^{Two}$ pp. 90-91 (May-Jun. 2002).

(Continued)

*Primary Examiner*—Nguyen N Hanh
(74) *Attorney, Agent, or Firm*—Burns & Levinson LLP; Bruce D. Jobse

(57) ABSTRACT

An electric motor starting device for an electric motor that incorporates air, gas, liquid or electrically actuated engine starter to initiate rotation of an electric motor and its associated driven component. Embodiments of the present invention provide apparatus and method for starting an electric motor whether or not it is being used to drive any type of mechanical or electrical device, and are consistent with use as an alternative to or in conjunction with any electric motor starting method or technology.

18 Claims, 12 Drawing Sheets

OTHER PUBLICATIONS

Elliott, J., "Dual Drive Compressor Proves Successful in Field Gathering Installation," *ComressorTech$^{Two}$* pp. 34 and 36 (Jan.-Feb. 2004).

LaGrone, S. et al., "Application of a 5500 RPM High Speed Induction Motor and Drive in a 7000 HP Natural Gas Compressor Installation," *IEEE* pp. 141-146 (1992).

Ohanian, S. et al. "Series of Parallel Arrangement in a Two-Unit Compressor Station," *ASME*; vol. 124:936-941, (Oct. 2002).

Oliver, J.A. et al., "High-Speed, High-Horsepower Electric Motors for Pipeline Compressors: Available ASD Technology, Reliability, Harmonic Control," *IEEE* Transactions on Energy Conversion vol. 10, No. 3 pp. 470-476 (Sep. 1995).

Oliver, J.A. et al., "Electrification of Natural Gas Pipelin—A Great Opportunity for Two Capital Intensive Industries," *IEEE* Transactions on Energy Conversion vol. 14, No. 4 pp. 1502-1506 (Dec. 1999).

Rama, John C. et al., "High Speed Electric Drive Applications, Experience, Potential & Pitfalls-A Global Overview," *IEEE* Paper No. PCIC-95-18, pp. 167-174 (1995).

Sabella, D. et al., "Full-Load String Test Meets Stringent Goals for LNG Project Compressor," *Oil & Gas Journal*, pp. 62-67 (Nov. 2002).

Wrenn, Jr., K. Frederick, "Electric Powered Compression: A Viable Approach for Meeting New Pipelines," *Pipeline & Gas Journal*, pp. 60-66 (Oct. 2000).

"Electrification of Gas Pipeline and Storage Compressors: Strategic Load Growth and Business Development Opportunities," *EPRI* PO-113349 (Jun. 1999).

Product Report, "Diesel & Gas Publication," Oct. 1993.

"Variable Speed Drives for Large Turbomachines," *Siemens*, pp. 1-24 (2002).

Non-final Office Action dated Nov. 28, 2008 for U.S. Appl. No. 11/371,141, filed Mar. 8, 2006. Applicant: John B. Manning.

Response dated May 28, 2009 to non-final Office Action dated Nov. 28, 2008 for U.S. Appl. No. 11/371,141, filed Mar. 8, 2006. Applicant: John B. Manning.

* cited by examiner

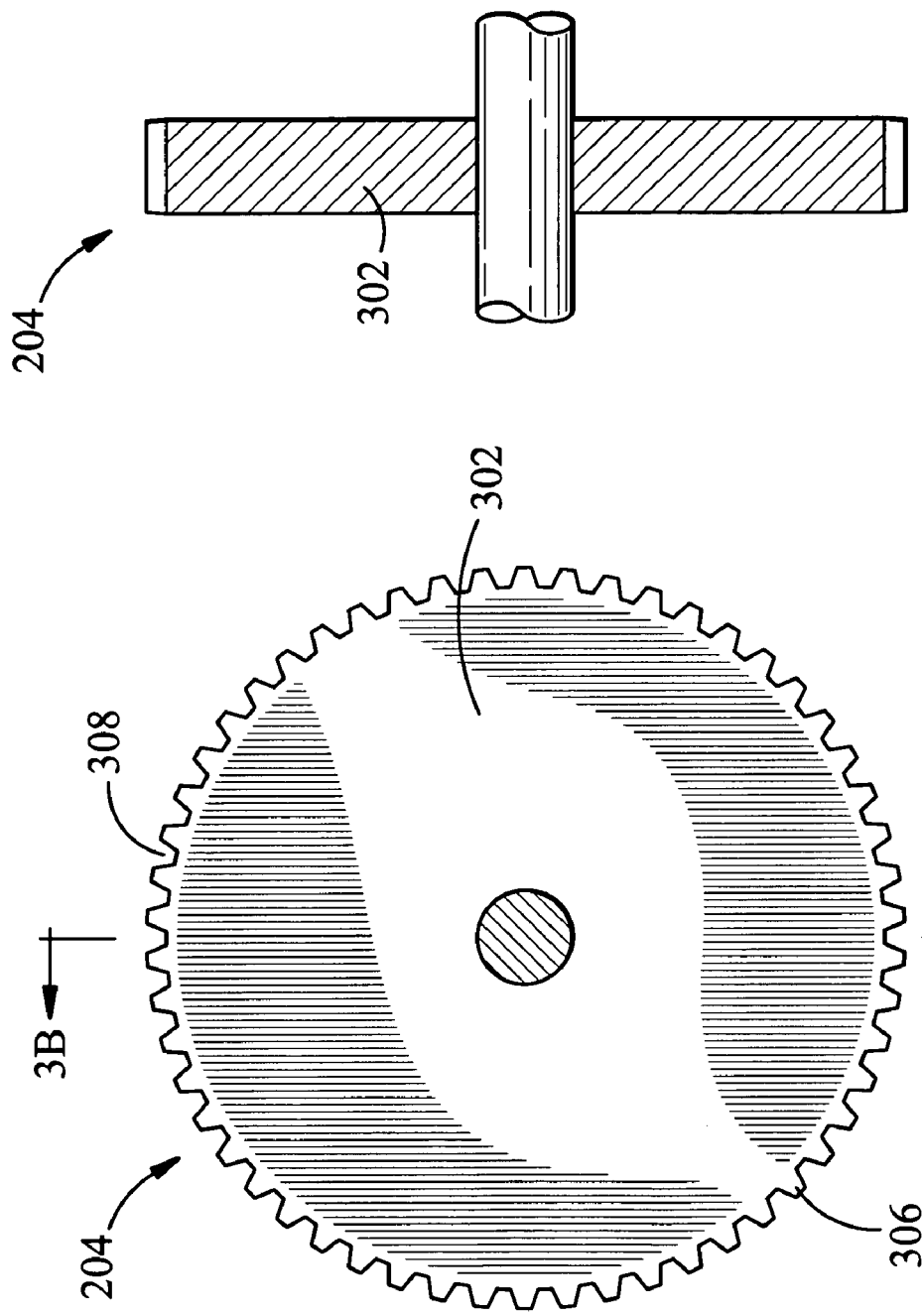

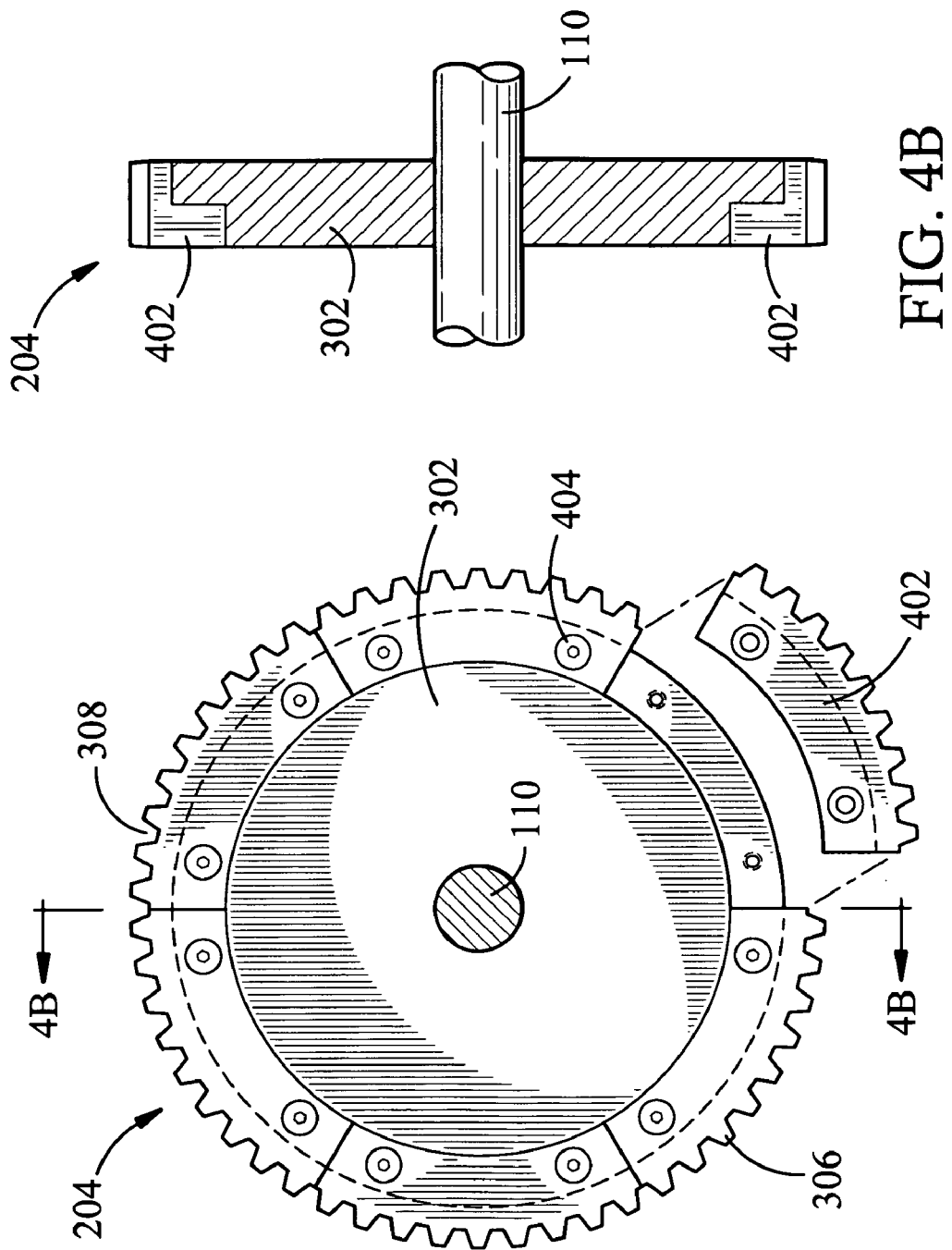

ELECTRIC MOTOR STARTING DEVICE

CROSS REFERENCE TO RELATED APPLICATIONS

This application claims priority from U.S. Provisional Application 60/659,489, filed Mar. 8, 2005 and incorporated herein by reference in its entirety.

FIELD OF THE INVENTION

The present invention relates generally to the field of electric motors and, more particularly, to starting of electric motors.

BACKGROUND OF THE INVENTION

Electric motors are widely used to drive a variety of rotating equipment, such as pumps and other mechanical or electrical devices. Issues considered when installing an electric motor are the horsepower requirement of the motor and the voltage on which the motor operates. Following selection of horsepower and operating voltage of the motor, means of starting the motor is chosen. Selection depends on application requirements, such as compatibility with variable speed control, variable voltage or frequency starting requirements, and limitation of starting capacity, that is, whether the amount of current available on the circuit for starting is limited in any way.

Methods available for starting an electric motor include an "across the line" motor starter, a "variable speed (variable frequency) drive", a "variable voltage" or "soft starter." Starter selection is influenced by the requirement that starting an electric motor to rotate from a fully stopped position demands that electric motor windings conduct as much as six to eight times the normal winding operating current, where the windings may be located in the stator, in the rotor, or in both, depending upon the design of the electric motor. This excess demand for current is termed the "lock rotor current" rating of the motor or the instantaneous current draw on the system.

Issues directly related to the lock rotor current rating, especially ratings for large electric motors, may influence the cost of electricity, the installation cost, adequate availability of sufficient capacity from utility distribution circuits, and availability of electric power from the utility. Often a local utility must upgrade power lines coming into an industrial site in connection with installation of large electric motor loads to be able to meet the lock rotor current demands of the electric motor. Costs associated with these issues may prevent installation of large electric motors in some areas.

Most electric utilities in the U.S. consider the availability of extra capacity when establishing an electricity rate to large industrial users of electricity. Electric utilities often penalize large industrial users with higher electricity prices to compensate for peak electricity demands which exceed the base load or constant load requirements of the users. This is especially true when user equipment requires instantaneous and short spikes of current, as when starting an electric motor. Lock rotor current ratings of many electric motors require the utility to have the extra capacity in reserve. Reserve or peak load demand is more expensive to provide in most cases. As a result of the extra cost of using an electric motor to drive equipment, gas engines can be more feasible.

Gas engine-driven compressors are used in most gas compressor stations, despite having significant drawbacks. A portion of the natural gas forwarded at the gas compression station or installation is used to operate the natural gas-fired engines that drive the gas compressors. Because of the high cost of gas-fired engines, gas compressor units usually use high rpm gas engines rather than slower versions. Operation and maintenance costs of the gas engine compressors are usually high and constitute a large portion of the cost of operating a gas compressor. Unscheduled down time due to unexpected engine failures are common. Major engine overhauls are frequently necessary and are costly.

An electric motor driven compressor requiring less maintenance and providing increased run time would be more feasible if the price of electricity were less. However, often, utilities, facing limited capacity in rural areas, force customers to limit their demand for electric power. Accordingly, there is a need to limit or eliminate the lock rotor current draw of electric motors.

SUMMARY OF THE INVENTION

The needs of the present invention set forth above as well as further and other needs and advantages of the present invention are achieved by the embodiments of the invention described herein below.

According to one aspect of the present invention, an electric motor includes a stator, an armature, a housing, and at least one starter. The stator includes at least one stator winding sized to meet no more than the full load operating requirement of the electric motor. The armature includes an electric motor shaft, which includes an electric motor gear. The housing contains the stator and the electric motor gear. Each starter is coupled to the housing and includes an end with a starter shaft, which includes a gear. The gear of the starter shaft of each starter is capable of being selectively disengagably coupled to the electric motor gear.

In some embodiments of the present invention, the at least one starter comprises a plurality of starters where the plurality of starters include gears with different gear ratios in connection with the electric motor gear. In certain embodiments of the present invention, the gear of the starter shaft of the starter may be capable of being selectively disengagably coupled to the electric motor gear through an opening in said housing. In other embodiments of the present invention, the electric motor gear may include a flywheel with serrations at the periphery of the flywheel. In further embodiments of the present invention, the electric motor gear may include a flywheel coupled to one or more removable peripheral sections having a plurality of serrations.

In additional embodiments of the present invention, each starter may include another end, which may include another starter shaft, which may include a gear, and which may include a turbine coupled to the another shaft. The starter shaft may include another gear, which may be capable of coupling to the gear of the another starter shaft. Each starter may be coupled to a source of pressurized liquid or compressed gas.

The another end may further include a starter electric motor coupled to the another shaft. The another gear of the starter shaft may be capable of coupling to the gear of the another starter shaft. The electric motor may further include a solenoid electrically coupled to the starter electric motor and capable of being in an on-position and an off-position. The gear of the starter shaft may couple to the electric motor gear in the on-position of the solenoid and the gear of the starter shaft may not couple to said electric motor gear in the off-position of the solenoid.

According to another aspect of the present invention, a method of starting an electric motor having a rotor includes engaging at least one starter with the rotor, activating each starter, utilizing the starter to rotate the rotor, detecting a rotational speed of the rotor, deactivating each starter at a time when the rotational speed of the rotor reaches a target rotational speed, disengaging the each starter from the rotor, and applying electricity to the electric motor at a predetermined time after the detected rotational speed of the rotor has reached the target rotational speed.

In some embodiments of the present invention, the target rotational speed of the rotor may be substantially 70% of a rated rotational speed of the rotor. In other embodiments of the present invention, disengaging each starter and applying electricity to the electric motor may be substantially simultaneous. In additional embodiments of the present invention, the method may further include deactivating and disengaging each starter at a predetermined time after said activating each starter if the rotor has not reached substantially the target rotational speed.

For a better understanding of the present invention, together with other and further aspects thereof, reference is made to the accompanying drawings and detailed description and its scope will be pointed out in the appended claims.

BRIEF DESCRIPTION OF THE FIGURES

For a better understanding of the present invention, reference is made to the figures, in which:

FIG. 3A is a front view and FIG. 3B is a cross-sectional view taken along line 3B-3B of FIG. 3A of an embodiment of the present invention including a ring gear containing a flywheel having serrations;

FIG. 4A is a front view and FIG. 4B is a cross-sectional view taken along line 4B-4B of FIG. 4A of an embodiment of the present invention including a ring gear containing a flywheel and removable peripheral sections having serrations;

DETAILED DESCRIPTION

Embodiments of the present invention provide an apparatus and method for starting an electric motor that may eliminate or diminish the need for a utility or power system to hold in reserve the additional current capacity normally required to start an electric motor, independent of whether the motor used to drive any type of mechanical or electrical device. Consequently, the amount of power required for a utility to provide, in the form of "extra capacity," is reduced. In turn, the amount that the utility charges to provide the power needed to operate a particular motor is similarly reduced. The embodiments may be used as an alternative to or in conjunction with any electric motor starting method or technology.

Embodiments of the present invention include an internal mechanical mechanism further including a mechanical starter or a plurality of mechanical starters, including liquid or gas engine starters and electric starters, mounted to a sub-base or mounting skid or housing or platform of the electric motor. The starter drives a serrated internal ring gear, which may be sectionalized and may include a flywheel. A rotating gear of the starter, upon actuation by means that may include gas, liquid, or electricity, engages its rotating gear teeth with teeth of the internal ring gear located within the starter. The starter rotates the rotor shaft of the electric motor to a predetermined rotational speed.

Once the shafts of the electric motor and of a driven component rotate at the predetermined speed, lock rotor current is no longer a concern. Electrical power may be applied to the electric motor without drawing current in excess of the normal full load operating current of the electric motor, the maximum current beyond which the electric motor sustains damage.

Figure 1:
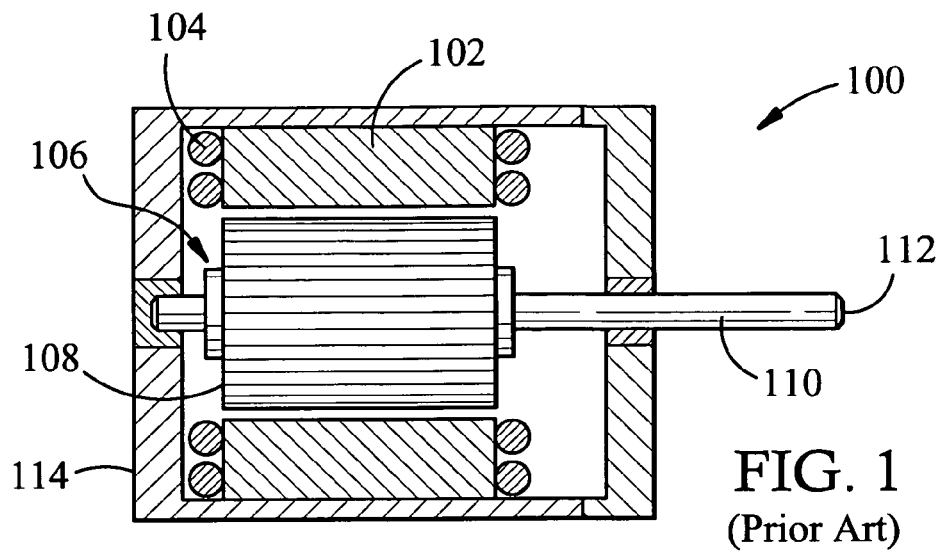
FIG. 1 is a schematic cross-sectional illustration of a prior art electric motor.

FIG. 1 shows a prior art cross section of an electric motor 100. An armature 106 of the electric motor 100 contains a permanent magnet 108 on a shaft 110 with a single end 112 protruding from a motor housing 114. A stator 102 orientated about the armature or rotor 106 contains magnetic material and is enclosed by stator windings or windings 104 illustrated in cross section. The diameter and number of the stator windings 104, usually made of a highly electrically conducting material such as copper, are selected consistent with the rated current, the maximum amount of current that the stator windings 104 are anticipated to carry. At a electrical current above the rated current, the electric motor 100 overheats to a dangerous degree. Similar limitations apply if the electric motor 100 has windings located on the armature 106.

During starting, the maximum current or rated current that electric motor stator windings 104 must conduct exceeds the current drawn when the electric motor 100 drives its full load. Starting rotation of the armature 106 requires a relatively large current, in fact, commonly many times the amount of current needed for full load operation. The current needed to initiate rotation of the armature 106 is called the lock rotor current, and the current needed for the electric motor 100 to rotate its load is termed the full load current. A resulting difficulty is that the stator windings 104 must be designed to be of sufficiently large cross-section to accommodate the lock rotor current where, in fact, such a large-sized wire is unnecessary for the full load operation of the electric motor 100. In this sense, the electric motor 100 is considerably over designed. The over design corresponds to a current-carrying capacity exercised only briefly at the beginning of each start-up session.

Figure 2A:
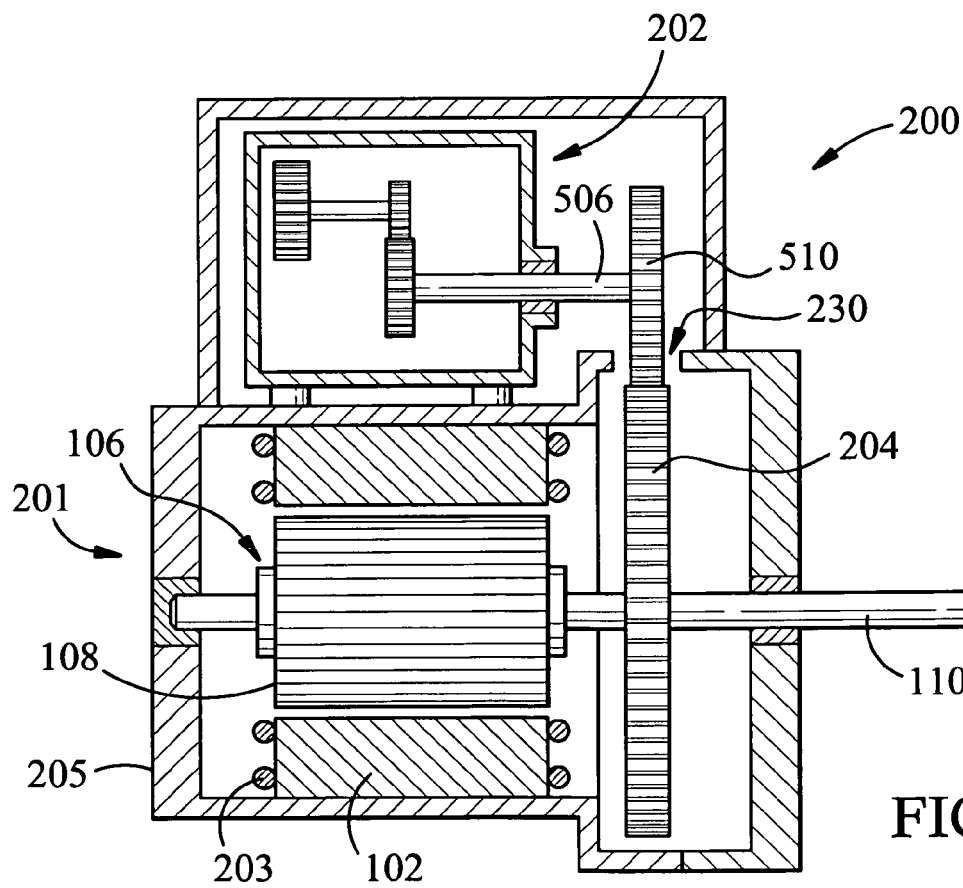
FIGS. 2A and 2B are schematic cross-sectional illustrations of embodiments of the present invention including an electric motor coupled to a starter.
Figure 2B:
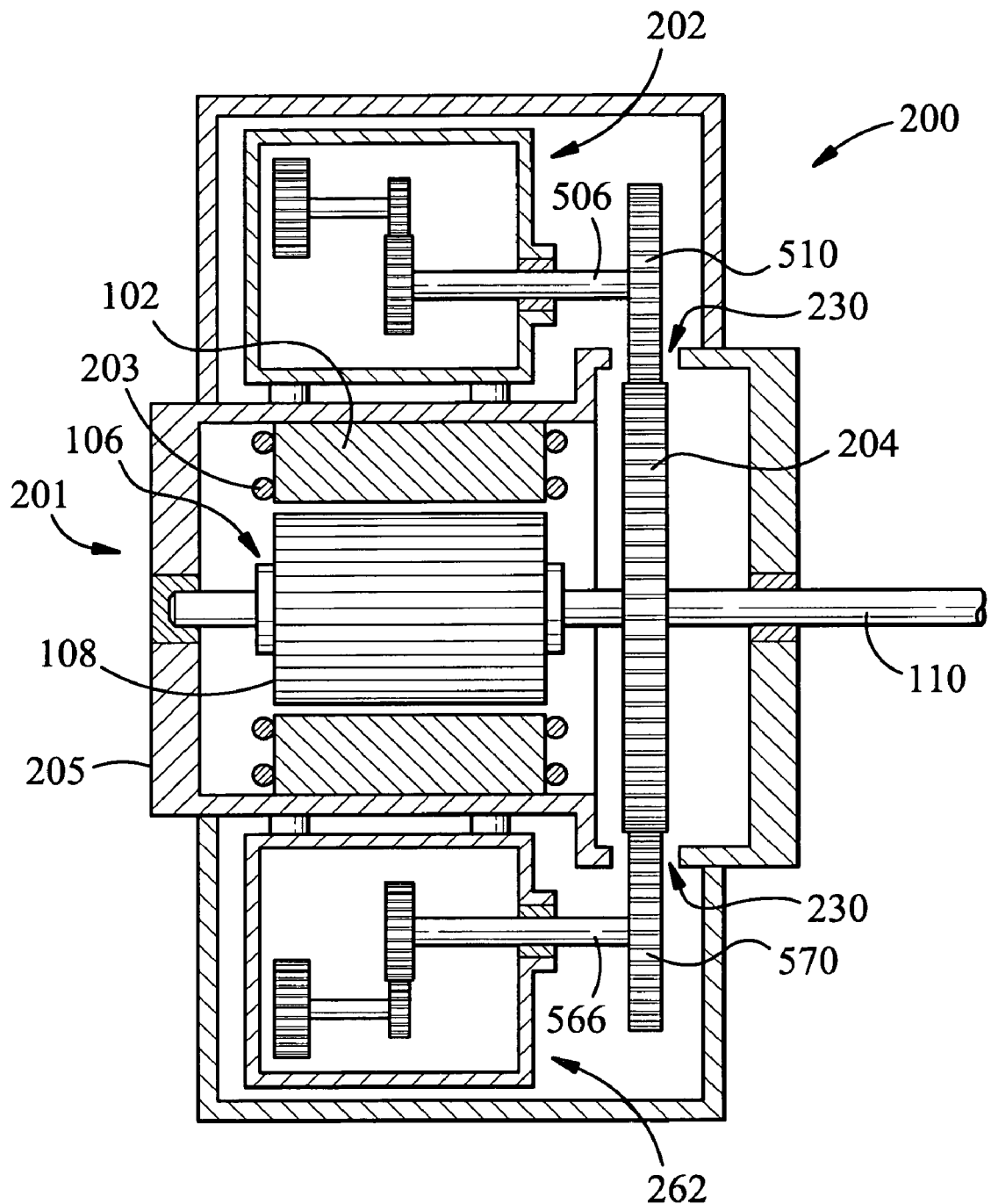

FIGS. 2A and 2B illustrate embodiments of the invention, an electric motor system 200 where an electric motor 201 is designed to be mounted by a single or a plurality or starters 202, which may be air, gas, liquid, or electrically driven. The armature 106 of the electric motor 201 contains an electric motor shaft or rotor shaft or armature shaft 110 mounted with a ring gear 204, which may include a flywheel 302 having serrations or teeth 306 at its periphery 308 (FIGS. 3A and 3B). The serrations 306 may also be included in peripheral removable sections 402 attached to the periphery of the flywheel (FIGS. 4A and 4B). One or more of a plurality of starters 202 may be coupled to the housing of the electric motor (FIG. 2B).

In operation, one or all of the starters 202 may engage the electric shaft gear or ring gear 204 with a starter gear 510 located on a starter shaft 506, either collectively or individually, through an aperture or opening or apertures or openings 230 in the electric motor housing 205. The starter gears 510 and 570 of the starters 202 and 262 of FIG. 2B may form different gear ratios with the ring gear 204. Different amounts of torque may be furnished to the electric motor shaft 110 by selectively activating different combinations of the starters 202. A system 200 including a plurality of starters 202 allows the system 200 to meet low rotational speed torque requirements and high rotational speed requirements.

Each starter 202 or, if more than one, each combination of starters 202, is sized for each application so as to be able to rotate the electric motor shaft 110 and a driven component shaft assembly, such as a compressor 114, at a maximum rotational speed of up to substantially 70% of the rated operating rotational speed of the electric motor, where the rated operating rotational speed of the electric motor 210 is the operating speed at which the electric motor 210 is designed to operate in steady state. Since the starter 202 rotates the electric motor shaft 110 and the driven component shaft assembly 114 before the electric motor 201 is energized, the normal amount of lock rotor current experienced during starting the electric motor 201 from a stopped position is no longer present. As a result, an electric motor designed to handle a certain full load may be constructed with stator windings of reduced diameter and/or number. The present invention as further illustrated and described with respect to FIGS. 2A, 2B, 3A, 3B, 4A, 4B, 7-9, 12 and 13. Incorporate therein, for example, conventional starters 500 and/or 600 described in detail below.

Figure 5:
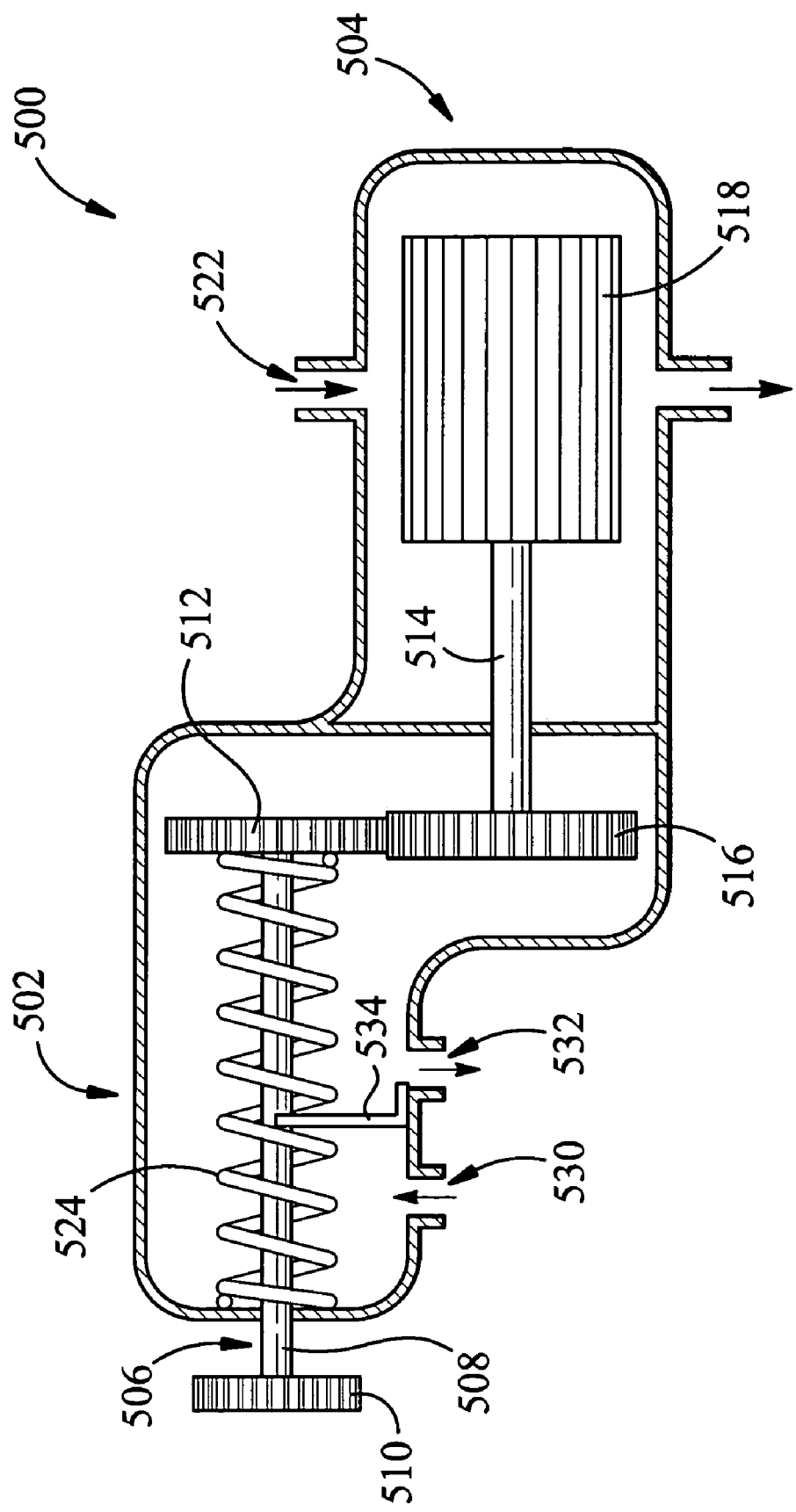
FIG. 5 is a schematic cross-sectional illustration of a prior art compressed gas or pressurized liquid driven starter.

FIG. 5 shows a prior art embodiment of a starter 500 that is operated or driven by compressed gas or pressurized liquid and has a driving end 502 and a driven end 504. The driving end 502 contains a driving end shaft or driving shaft or starter shaft 506, which may contain a pre-engaging bendix 508 for engaging the ring gear 204 mounted on the electric motor shaft 110. A driving gear or starter shaft gear 510 on the driving end shaft 506 is able to mate or engage with an electric motor shaft gear or ring gear 204. At the other end of the driving end shaft 506 is a driven gear 512.

At the driven end 504 of the starter 500 is a driven end shaft or driven shaft 514. The driven end shaft 514 contains a driving gear 516 that engages the driven gear 512 of the driving end shaft 506. At the other end of the driving end shaft 506 is a turbine 518. Compressed gas or pressurized liquid injected into the driven end 504 causes rotation of the turbine 518, and, when the driven gear 512 of the driving end shaft 506 engages with the driving gear 516 of the driven end shaft 514, rotation of the driving end shaft 506.

The driving end shaft 506 may be selectively engaged or disengaged from the driven end shaft 514. This corresponds to the driving end shaft 506 being translated backwards and forwards. Engagement or disengagement of the driving end shaft 506 is established by gas or liquid flow injected into an inlet 522 of the driven end 504. When compressed gas or pressurized liquid is injected, the driving end shaft 506 translates toward the ring gear 204 and the driving gear 516 of the driven shaft 514 engages the driven gear 512 of the driving shaft 506. When gas or liquid pressure is removed, a spring 524, formerly expanded when the driving shaft 506 translated, restores the driving end shaft 506 to its original position, disengaged from the driving shaft 514.

Upon actuation, the bendix gear or driving gear 510 of the driving end shaft 506 of the gas or liquid starter 500 engages the teeth 306 of the ring gear 204 by use of pressurized liquid or compressed gas. Upon full engagement of the bendix 508 into the teeth 306 of the ring gear 204, outlet 532 is automatically opened by displacement of cover 534 and additional compressed gas or pressurized liquid is then supplied to the starter 500. At this time, the starter 500 begins to rotate the bendix 508, which, in turn, rotates the armature or rotor 106 and any other components attached to the electric motor shaft 110.

Figure 6:
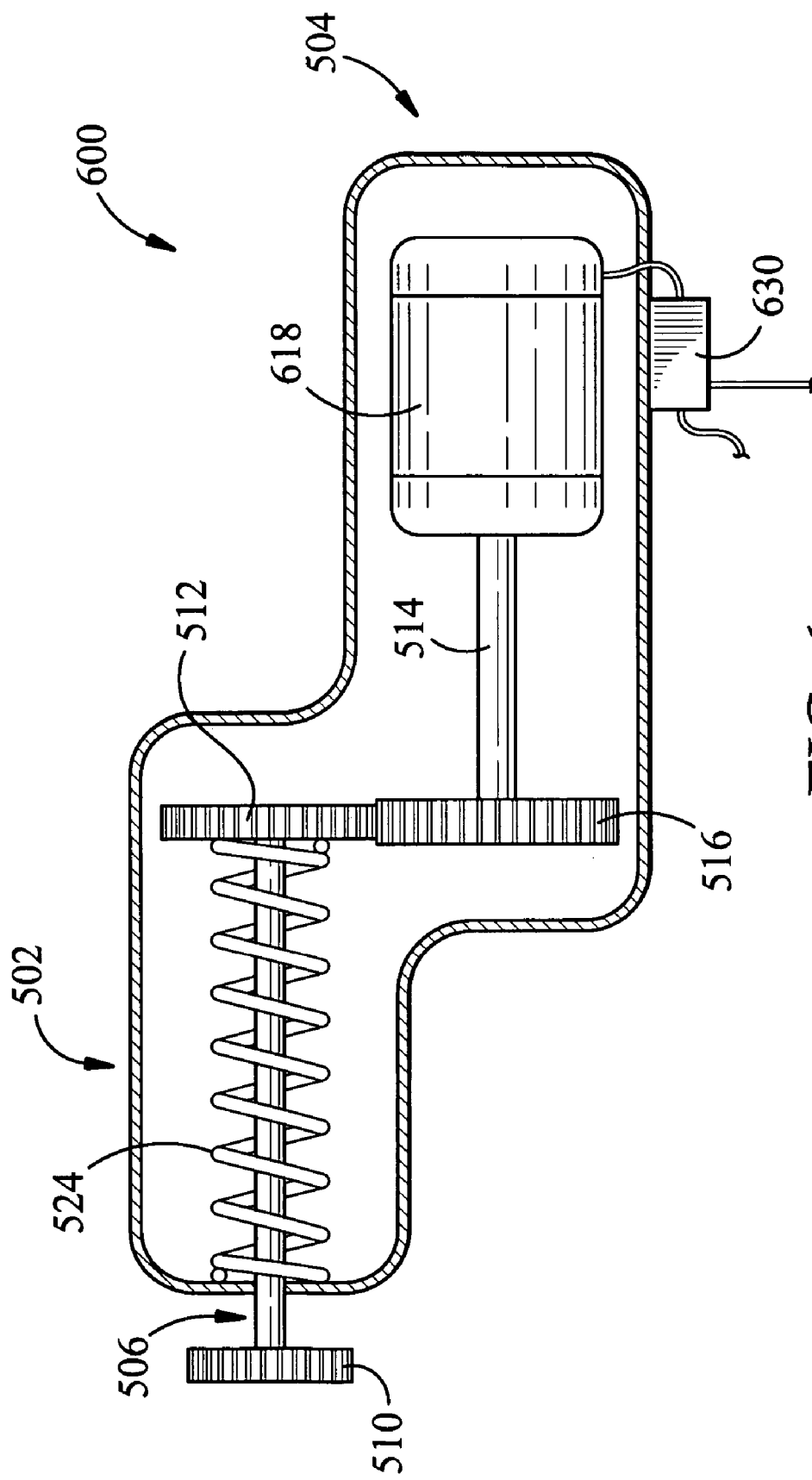
FIG. 6 is a schematic cross-sectional illustration of a prior art electrically driven starter.

FIG. 6 illustrates a starter 600 where the starter 600 is electrically driven. As in the case of a compressed gas or pressurize liquid-driven starter 500, the electrically driven starter 600 also contains two shafts, the driving end shaft 506 and the driven end shaft 514. In this case, the driven end shaft 514 contains a starter electric motor 618 instead of a turbine 518. If the driven gear of the driving end 502 shaft engages the driving gear 516 of the driven end shaft 514, the driven gear 512 of the driving end shaft 506 rotates, and, if engaged with the armature shaft gear or ring gear 204, rotates the armature 106.

FIG. 6 also includes, for the starter 600 incorporating the starter electric motor 618, a solenoid 630 used to engage or disengage the driving end shaft 506 with or from the armature gear or ring gear 204. When energized so as to be in an on-position, the solenoid 630 causes the starter electric motor 618 to rotate the driven shaft 514, thereby rotating the driving end shaft 506. As a result of the rotation of the driving end shaft 506, the driving end shaft 506 translates toward the ring gear 204. The driving gear or bendix gear 510 of the driving end shaft 506 engages the ring gear 204. As a result, the electric motor shaft 100 of the armature or rotor 106 rotates. When the solenoid 630 is deenergized so as to be in an off-position, electric power is removed from the starter electric motor 618. A spring 524 engaging the driving end shaft 506 causes the driving gear 510 of the driving end shaft 506 to disengage from the armature gear or ring gear 204 by translation in the opposite direction, away from the armature gear or ring gear 204.

Figure 7:
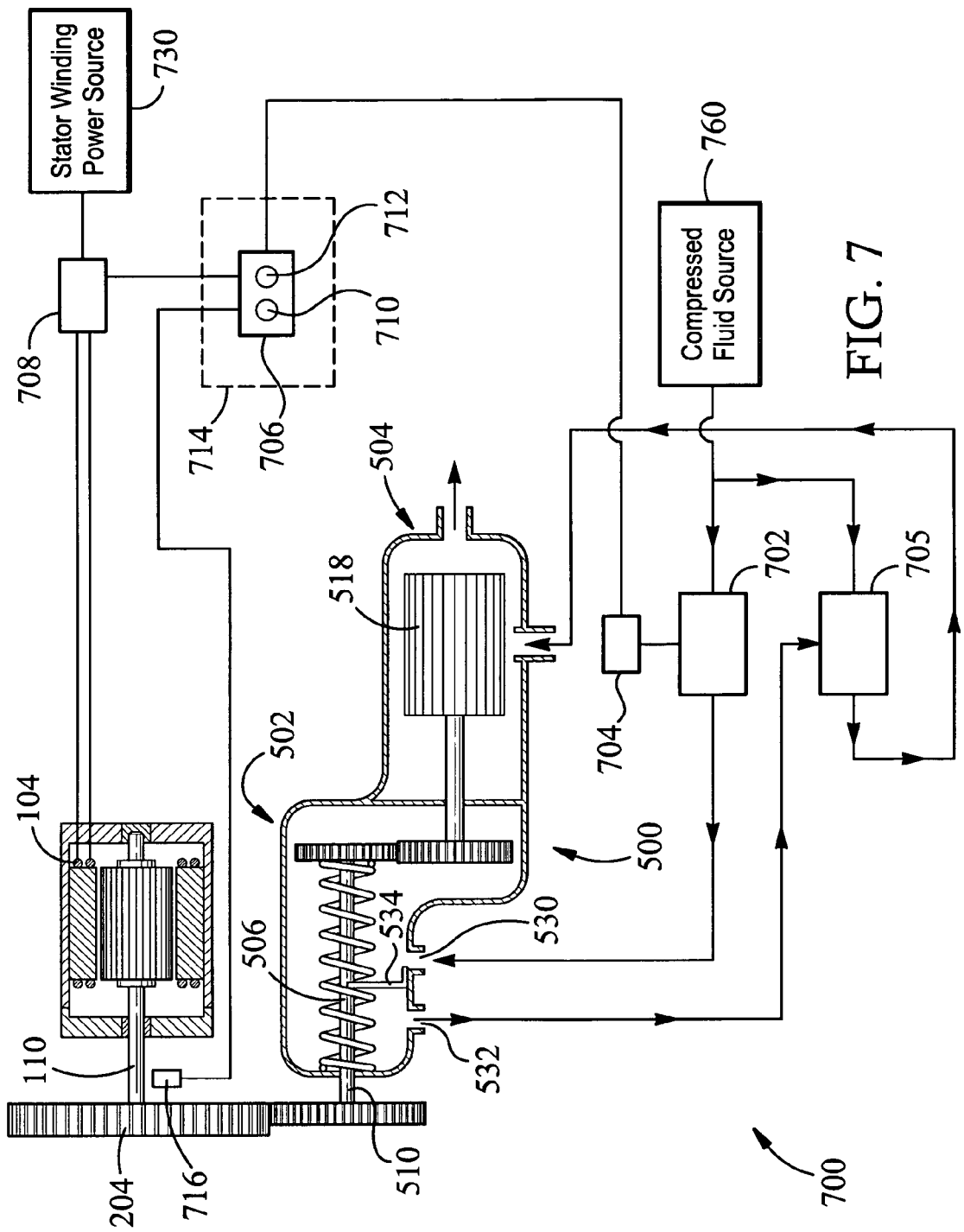
FIG. 7 is a schematic illustration of an embodiment of the present invention including a system for operating a compressed gas or pressurized fluid-driven starter.

FIG. 7 illustrates an embodiment of the invention showing a system 700 for operating a compressed gas or pressurized liquid-driven starter 500. A regulator 702 is connected to a start switch 704. When activated, the regulator 702 allows a pressurized liquid such as a compressed gas or pressurized liquid to move from a pressurized fluid source 760 into the inlet 532 of the driving end 502 of the starter 500, causing the driving end shaft 506 to move and to engage the armature gear or ring gear or electric motor shaft gear 204. Once engagement occurs, another regulator 705 allows compressed gas or pressurized liquid to enter the driven end 506 of the starter 500, thereby rotating the turbine 518 and, consequently, the driving end shaft 506. Rotation of the armature shaft of the electric motor, or electric motor shaft, 110 results.

A controller 706 monitors the speed of the electric motor armature shaft 110. The controller 706 is also connected to a stator switch 708 that controls connection between a source of power 730 and the stator windings 203. While the starter 500 rotates the electric motor shaft 110, the electronic control device or controller 706, containing a speed switch 710 and a relay 712 and located in a separate control box 714 mounted on the unit 200, uses information from a rotational sensing device 716 mounted in the electric motor 201 that senses the rotational speed of the electric motor shaft 110.

When the rotational speed of the electric motor shaft 110 reaches a target rotational speed, the electronic control device 706 begins to energize the electric motor 201. The starter 500 continues to rotate the electrical motor shaft 110 until the electric motor 201 has sufficient electrical energy to rotate the electric motor shaft 110 at a rotational speed exceeding the rotational speed at which the starter 500 rotates the electric shaft motor 110. Once the electric motor 201 is capable of providing the rotational speed provided by the starter 500, the compressed gas or pressurized liquid starter bendix 510 disengages from the ring gear 204 and the electric motor 201 rotates at its rotational speed under its own electric power.

Figure 8:
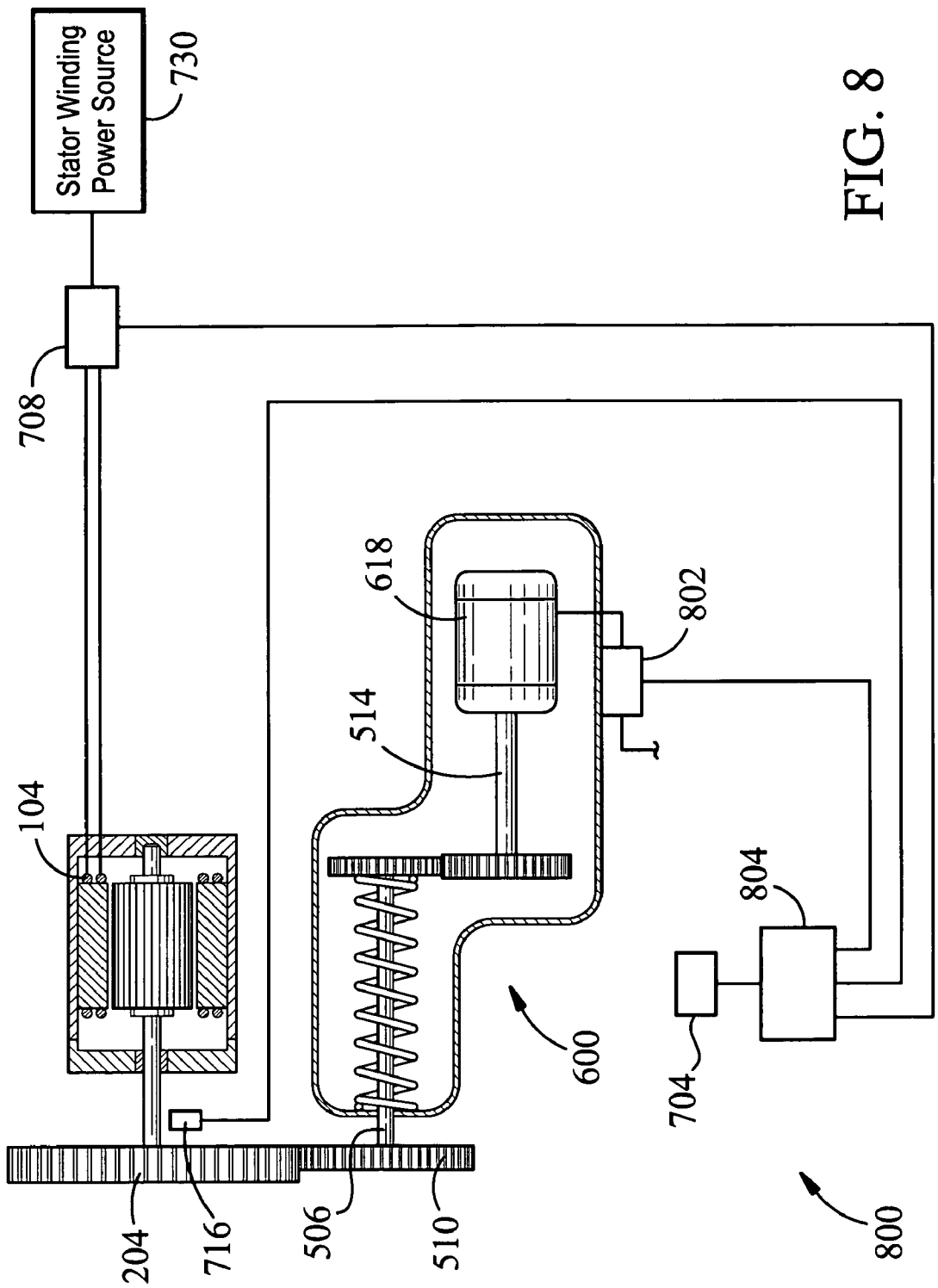
FIG. 8 is a schematic illustration of an embodiment of the present invention including a system for operating an electrically-driven starter.

FIG. 8 illustrates an embodiment of the invention showing a system 800 for operating an electrically-driven starter 600. In this case, the driven end shaft 514 is coupled to a starter electric motor 618. When a solenoid 630 is activated, electric power is provided to the starter electric motor 618 so as to rotate the driven end shaft 514. The driven end shaft 514 rotates the driving end shaft or bendix 506, which translates toward the ring gear 204 as a result of its rotation, causing the driving end gear 510 of the driving end shaft 506 to engage the armature shaft gear or ring gear or the electric motor shaft gear 204.

A start switch 704 to initiate rotation of the electric motor shaft 110 is connected to a controller 804. The controller 804 also monitors the rotational speed of the electric motor shaft 110 by means of a rotational speed detector 716. Such a detector 716 may, for example, include magnetic or optical detection of rotation. The controller 804 connects to the solenoid 630. In reaction to initiation of a start switch 704, the driving gear 510 of the driving end shaft 506 may engage with the armature gear or ring gear 204. Further, the controller 804 is connected to a stator switch 708 that may controllably provide excitation to the stator windings 203 from a source of electric power 703. The controller 804 may also establish excitation of the starter electric motor 618.

Figure 9:
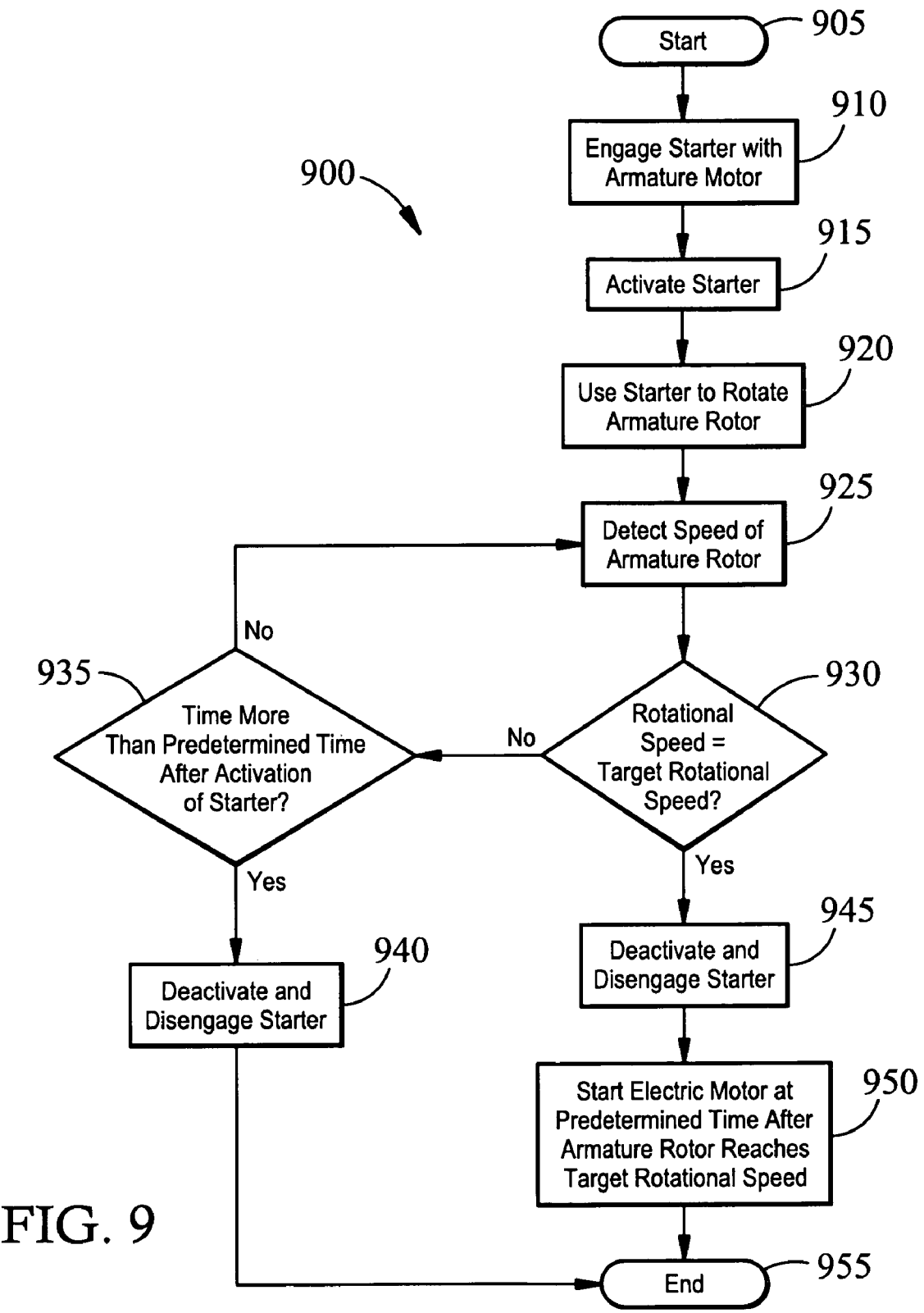
FIG. 9 contains a flow chart for a method for starting an electric motor with a compressed gas or pressurized liquid-driven starter according to an embodiment of the present invention.

FIG. 9 provides a flow chart 900 for a method for starting an electric motor with a compressed gas- or pressurized liquid-driven starter 500. First, the starter 500 is engaged with the armature or rotor 106 (Step 910). Next, the starter 500 is activated (Step 915). The starter 500 is then used to rotate the armature (Step 920) and the speed of the armature 106 is detected (Step 925). If the rotational speed of the armature 106 matches the target rotational speed (Step 930), the starter 500 is deactivated and disengaged. (Step 945) If the rotational speed of the armature 106 does not match the target rotational speed, and if the time elapsed from starter 500 activation does not exceed a predetermined amount (Step 935), monitoring of the rotational speed of the armature 106 continues (Step 925). However, if the predetermined time is exceeded and the rotational speed of the armature 106 has not reached its target or predetermined rotational speed, the starter 500 is deactivated and disengaged. If the rotational speed of the armature 106 matches the target rotational speed within the predetermined amount of the time, the starter 500 is deactivated (Step 945) and the electric motor 201 is started (Step 950). The starting of the electric motor may be another predetermined amount of time after the armature rotor reaches its target rotational speed.

Figure 10:
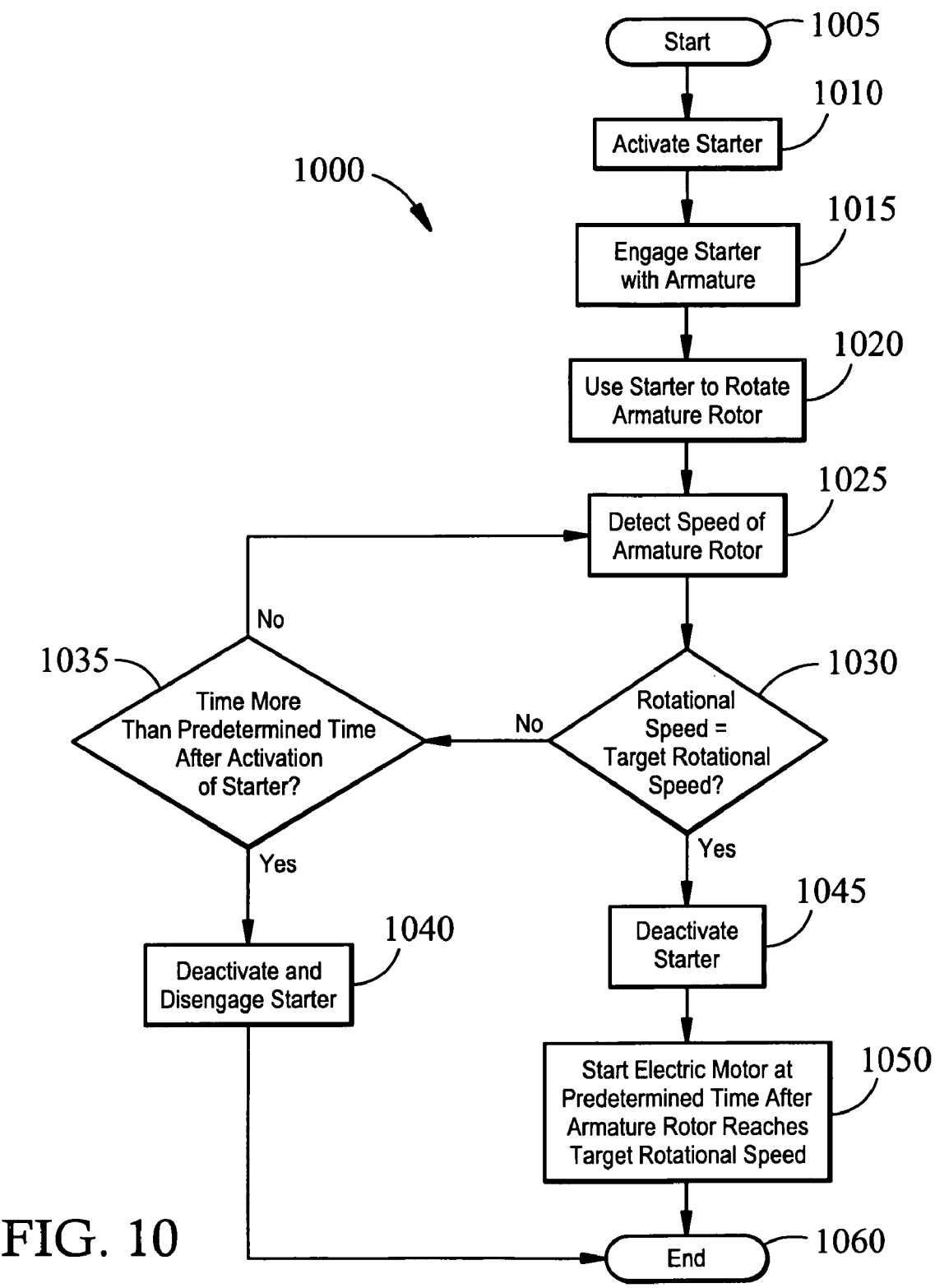
FIG. 10 contains a flow chart for a method for starting an electric motor with an electrically-driven starter according to an embodiment of the present invention.

FIG. 10 provides a flow chart 1000 for method for starting an electric motor 201 with an electrically-driven starter 600. First, electric power is provided to the starter electric motor 618 to activate the starter 600 (Step 1100). Engagement of the starter 600 with the armature 106 of the electric motor 201 follows (Step 1015). The starter 600 is then used to rotate the armature 106 (Step 1020) and the speed of the armature 106 is detected (Step 1025). If the rotational speed of the armature 106 matches the target rotational speed (Step 1030), the starter 600 is deactivated and disengaged (Step 1045). If the rotational speed of the armature 106 does not match the target rotational speed, and if the time elapsed from starter activation does not exceed a predetermined amount (Step 1035), monitoring of the rotational speed of the armature 106 continues (Step 1020). However, if the predetermined time is exceeded and the rotational speed of the armature 106 has not reached its target or predetermined rotational speed (Step 1035), the starter 600 is deactivated and disengaged (Step 1040). If the rotational speed of the armature 106 matches the target rotational speed within the predetermined amount of the time, the starter 600 is deactivated (Step 1045) and the electric motor 201 is started (Step 1050). The starting of the electric motor 201 may be another predetermined amount of time after the armature 106 reaches its target rotational speed.

Figure 11:
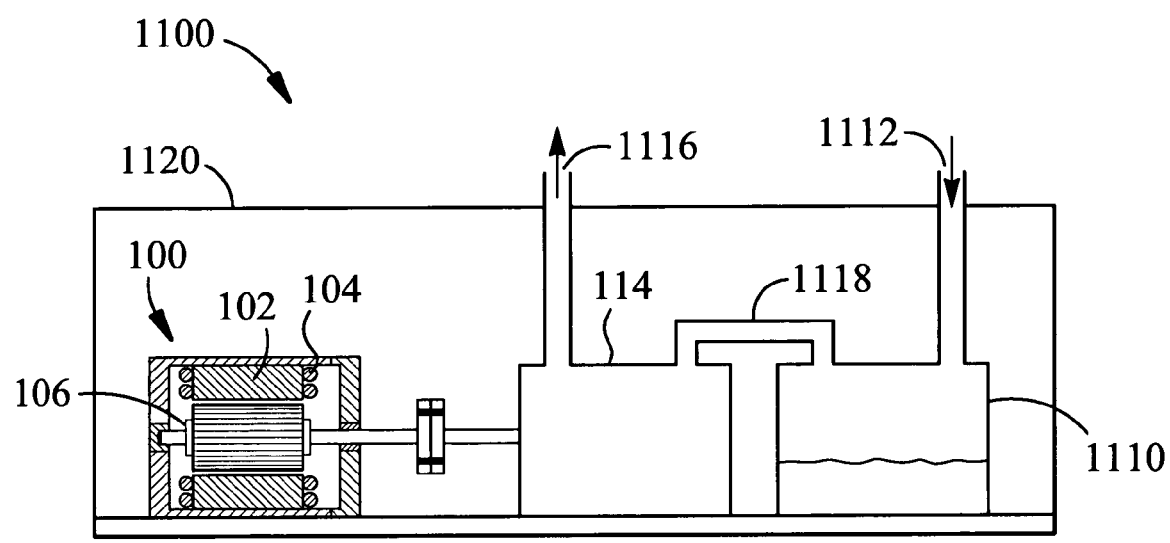
FIG. 11 is a schematic illustration of a prior art air conditioning system.

FIG. 11 illustrates a prior art air conditioning or a/c system 1100. The air conditioning system or a/c system 1100 includes a compressor 1114 coupled to an electric motor 100, to a container-holding refrigerant 1110, and to a plurality of pipes, including an inlet pipe 1112, an outlet pipe 1114, and a transfer pipe 1118. The compressor 1114, the electric motor 100, and the container 1110 are hermetically sealed within an air conditioning housing 1120.

The electric motor 100 contains a stator 102 with stator windings 104 sized to carry current necessary to start the electric motor 100 from a stopped position. The starting electric current is much more than required to rotate the armature 106 of the electric motor 100 at full load. More importantly, from the perspective of the utility providing the electricity to operate the electric motor 100, the utility must be able to supply electric power in the worst case situation, when all a/c systems 100 turn on at the same time. This collective turn-on effectively multiplies the utility capacity needed to operate the a/c systems 1100 to a value much in excess of steady state or full load requirements.

Figure 12:
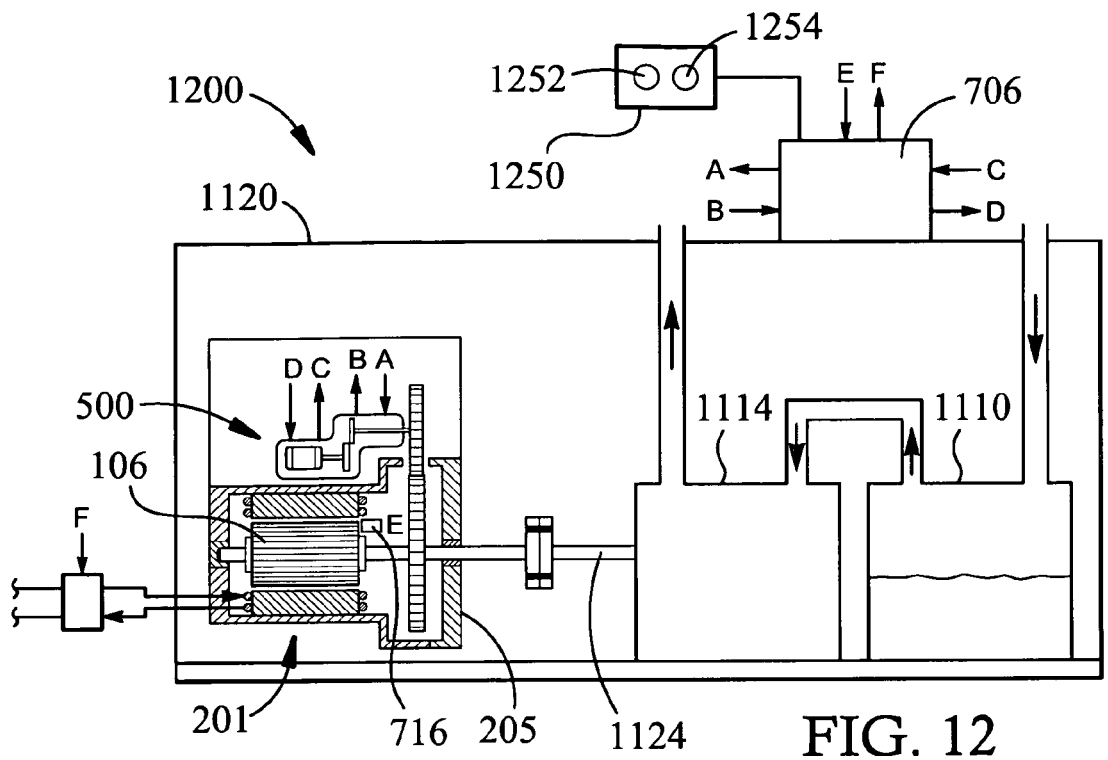
FIG. 12 is a schematic illustration of an air conditioning system employing a compressed gas or pressurized fluid-driven starter according to an embodiment of the present invention.

FIG. 12 illustrates an embodiment of the invention 200 where an a/c system 1200 employs a compressed gas or pressurized liquid-driven starter 500. An electric motor 201 and starter 202 combination according to embodiments of the invention is mounted together with a compressor 1114 and a container 1110 of refrigerant inside a sealed container 1120. In this case, the armature 106 of the electric motor 200 includes a gear 204 and the stator 102 and the gear 204 are contained within a motor housing 205. On the outside of the housing 205 is mounted the starter 500 having a driving end 502 and a driven end 504.

The driving end 502 containing a driving end shaft 506 with a driving gear 510 and a driven gear 512 and a driven end 504 containing a driven end shaft 514 with a driving gear 516 and a turbine 518. The driven gear 512 of the driving end shaft 506 engages with the driving gear 516 of the driven end shaft 514. When the driving gear 510 of the driving end shaft 506 engages the armature or ring gear 204, the turbine 518 attached to the driven end shaft 514 is able to rotate the armature shaft or rotor shaft or electric motor shaft 110. The agent for turning the turbine 518 may be compressed gas or pressurized liquid.

The system 1200 also includes a first 702 and second 704 regulator. The first regulator 702, upon activation of a starter switch 704, permits compressed gas or pressurized liquid to flow from the container 1110 to the driving end 506 of the starter 500 where the compressed gas or pressurized liquid causes the driving gear 510 of the driving end shaft 506 to engage with the armature gear or ring gear 204. Thereupon, the compressed gas or pressurized liquid flows to and activates the second regulator 704, allowing the compressed gas or pressurized liquid to flow from the container 1110 to the driven end 504 of the starter 500, thereby causing the turbine 518 to rotate.

A rotational speed detector 716 measures the speed of rotation of the electric motor shaft or armature shaft 110 or compressor shaft 1124, possibly by optical or magnetic means. A controller 706 is connected to the rotational speed detector 716, to a switch, and to the electric motor 201. A power source 1250 provides energy to the system and may include a battery 1252 and a solar panel 1254. (See also FIGS. 5 and 7).

Figure 13:
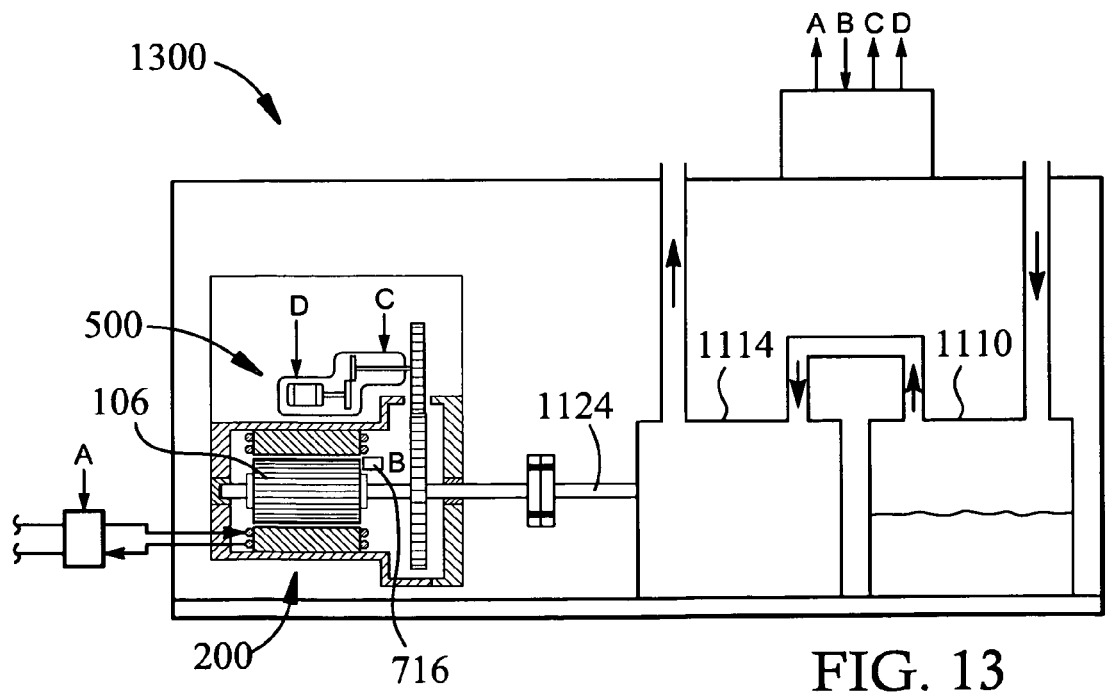
FIG. 13 is a schematic illustration of an air conditioning system employing an electrically-driven starter according to an embodiment of the present invention.

FIG. 13 illustrates an air conditioning system 1300 employing an electrically-driven starter 600 according to an embodiment of the invention. An electric motor 201 according to the invention is mounted together with a compressor 1114 and container 1110 of refrigerant inside the container 1110. The armature 106 of the electric motor 201 contains a gear or armature gear 204, and the stator 102 and the gear or armature gear 204 are contained within a housing 205. On the outside of the housing 205 is mounted a starter 202 having a driving end 502 and a driven end 504.

The starter 200 is electrically driven 600, where the driving end 502 contains a driving end starter shaft or driving shaft 506 and a driven end 504 contains a starter electric motor 618 with a starter electric motor shaft or driven shaft or driven end shaft 514 coupled to a starter electric motor shaft gear or driving gear 516. The driving end shaft 506 has a driving gear 510 and a driven gear 512. The driving gear 510 of the driving shaft 506 may couple to the electric motor gear 204 and the driven gear 512 of the driving shaft 506 may couple to the starter electric motor shaft gear or the driving gear 516 of the driven shaft 514.

The system 1300 further includes an electric solenoid 630 operably connected to a switch 709 and to the starter electric motor 618. A spring 524 is also coupled to the driving end electric starter shaft 514. A rotational speed detector 716 measures the speed of rotation of the electric motor shaft or armature shaft 110 or compressor shaft 1124, including by optical or magnetic means. A controller 804 is connected to the rotational speed detector 716, to the switch 704, and to the electric motor 201. A power source 1250 provides energy to the system and may include a battery 1252 and a solar panel 1254. (See also FIGS. 6 and 8).

Since the electric motor does not experience any lock rotor current that normally requires a peak instantaneous load demand from the utility during start up, the utility can provide the electricity required to operate the motor at reduced rates.

Without peak load demands, the utility additionally benefits from a constant base load consumption of electricity. The larger the starting load requirements, the more the utility benefits.

Operators may utilize electric motor driven equipment and receive lower cost electricity rates required to make such use more feasible. Since the electric motor never experiences the increased current draw because the electric motor never demands the lock rotor current, the stator windings of the electric motor last longer and provide reduced operating and maintenance cost.

Use of embodiments of the invention, including the torque drive mechanism may also reduce the cost to install electric motors at new service sites and allow for increased capacity for installation of a larger number of electric motors or a larger motor at an individual site.

Embodiments of the invention may be incorporated in a newly assembled electric motor-driven piece of equipment or as a retro-fit kit to a pre-existing electric driven piece of equipment, and can be applied in the form of an exchanged motor.

Having thus described at least one illustrative embodiment of the invention, various alterations, modifications and improvements will readily occur to those skilled in the art. Such alterations, modifications, and improvements are intended to be within the scope and spirit of the invention. Accordingly, the foregoing description is by way of example only and is not intended as limiting.

What is claimed is:

1. An electric motor, the electric motor comprising:
   a stator, said stator including at least one stator winding and defining a full load operating current requirement of the electric motor, said at least one stator winding sized to meet no more than the full load operating requirement of the electric motor;
   an armature, said armature comprising an electric motor shaft, and said electric motor shaft including an electric motor gear;
   a housing, said housing containing said stator and said electric motor gear;
   a plurality of starters capable of being selectively and disengagably coupled to said electric motor gear; and
   said plurality of starters further comprising an end, said end including a starter shaft, and said starter shaft including gear.

2. The electric motor of claim 1, wherein said plurality of starters includes gears with different gear ratios in connection with said electric motor gear.

3. The electric motor of claim 1, wherein said plurality of starters includes ears with similar ear ratios in connection with said electric motor gear.

4. The electric motor of claim 1, wherein said electric motor gear comprises a flywheel with serrations at the periphery of said flywheel.

5. The electric motor of claim 1, wherein said electric motor gear comprises a flywheel coupled to one or more peripheral sections, said one or more peripheral sections being removable and having serrations.

6. The electric motor of claim 1, wherein at least one starter includes another end, said another end comprising another starter shaft.

7. The electric motor of claim 6, wherein said starter shaft comprises another gear.

8. The electric motor of claim 7, wherein said another starter shaft comprises a gear.

9. The electric motor of claim 8, wherein said another end further includes a turbine, said turbine coupled to said another shaft.

10. The electric motor of claim 9, wherein said another gear of said starter shaft is capable of coupling to said gear of said another starter shaft.

11. The electric motor of claim 10, wherein said plurality of starters is coupled to a source of pressurized liquid.

12. The electric motor of claim 10, wherein said plurality of starters is coupled to a source of compressed gas.

13. The electric motor of claim 8, wherein said another end further includes a starter electric motor, said starter motor coupled to said another shaft.

14. The electric motor of claim 13, wherein said another gear of said starter shaft is capable of coupling to said gear of said another starter shaft.

15. The electric motor of claim 13, the electric motor further comprising:
   a solenoid, said solenoid being electrically coupled to said starter electric motor and capable of being in an on-position and an off-position;
   wherein said gear of said starter shaft couples to said electric motor gear in said on-position of said solenoid and said gear of said starter shaft does not couple to said electric motor gear in said off-position of said solenoid.

16. The electric motor of claim 1, the electric motor further comprising a detector of a rotational speed of said electric motor shaft.

17. The electric motor of claim 16, wherein said detector of said rotational speed of said electric motor shaft is an optical detector.

18. The electric motor of claim 16, wherein said detector of said rotational speed of said electric motor shaft is a magnetic detector.

* * * * *